United States Patent

Ungnadner

[15] 3,648,029
[45] Mar. 7, 1972

[54] APPARATUS AND METHOD FOR SYNCHRONIZING DIGITAL DISTANCE PULSE COUNTERS

[72] Inventor: Friedrich Ungnadner, Erlangen, Germany

[73] Assignee: Siemens Aktiengesellschaft, Berlin and Munich, Germany

[22] Filed: Mar. 9, 1970

[21] Appl. No.: 17,564

[30] Foreign Application Priority Data

Mar. 13, 1969 Germany ..................... P 19 12 663.7

[52] U.S. Cl. ................... 235/92 DN, 235/92 R, 235/92 CC, 235/92 PK, 340/21, 235/92
[51] Int. Cl. ....................................................... G06m 1/28
[58] Field of Search ................... 235/92, 61, 20, 70, 290, 57, 235/66, 103, 98, 95; 340/268, 21

[56] References Cited

UNITED STATES PATENTS

| | | | |
|---|---|---|---|
| 3,239,138 | 3/1966 | Loeffler | 235/98 |
| 2,903,093 | 9/1959 | Lusti et al. | 340/19 X |
| 3,149,305 | 9/1964 | Glaser et al. | 340/21 |
| 3,027,817 | 4/1962 | Loeffler | 235/98 UX |
| 3,564,216 | 2/1971 | Laycak | 235/92 SH |

Primary Examiner—Maynard R. Wilbur
Assistant Examiner—Joseph M. Thesz, Jr.
Attorney—Curt M. Avery, Arthur E. Wilfond, Herbert L. Lerner and Daniel J. Tick

[57] ABSTRACT

A stationary switch having a defined response time is positioned along the travel path of a moving object and provides a signal for multiplying the distance pulses corresponding to the travel position of the moving object during the response period. A lead counter is connected to a pulse generator coupled to the moving object, which produces the distance pulses, and to the switch, and stores the distance pulses and the signal provided by the switch. A distance pulse counter is coupled to the pulse generator and to the lead counter in a manner whereby the distance pulse counter is reset in accordance with the count position of the lead counter.

9 Claims, 3 Drawing Figures

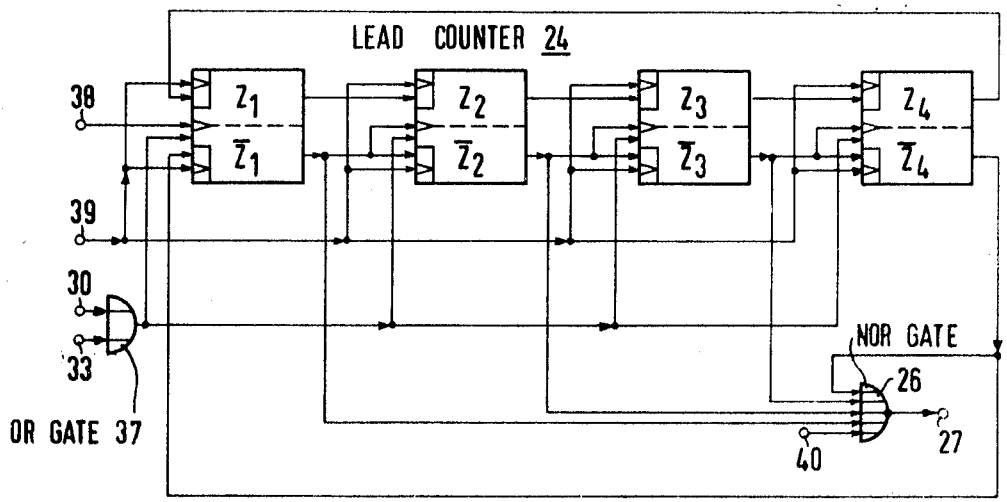
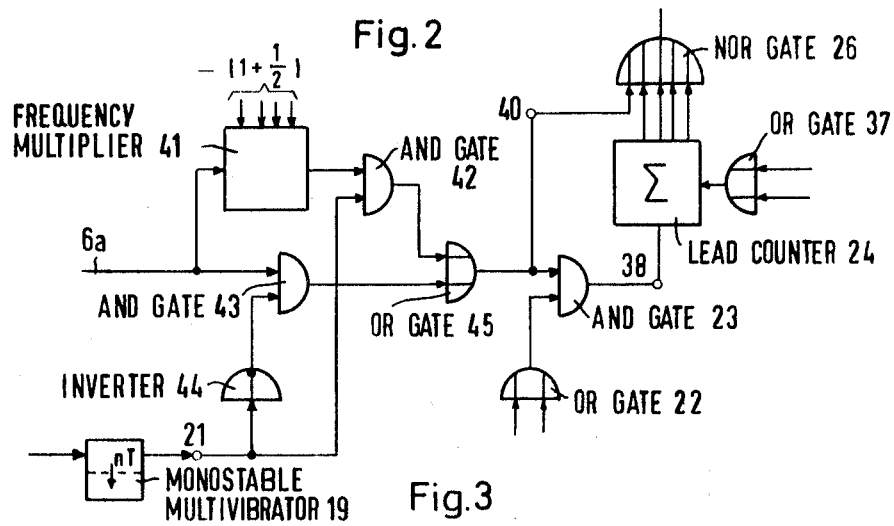
Fig.2
Fig.3 the # APPARATUS AND METHOD FOR SYNCHRONIZING DIGITAL DISTANCE PULSE COUNTERS

DESCRIPTION OF THE INVENTION

The invention relates to digital distance pulse counters. More particularly, the invention relates to apparatus and a method for synchronizing digital distance pulse counters.

To measure the distance travelled or moved by a moving object, it is known to emit digital distance or path pulses along the travel path. The pulses are produced by a pulse generator which is suitably mounted on or coupled with the moving object. The pulses are subsequently stored in a pulse counter. The count position of the distance pulse counter is thus an indication of the position of the moving object. The indication of the position of the moving object is accurate, however, only as long as perfect emission and transmission of pulses occurs and the pulse generator and the moving object are closely joined to each other. When longer distances or paths are to be measured, there is always a possibility that a pulse may be skipped or an interferring pulse may be included with the distance pulses. There is also a possibility that there may be slippage or play in the coupling between the pulse generator and the moving object. In order to preclude there difficulties, and to insure perfect accuracy, the position of the pulse counter should be synchronized, from time to time. That is, the pulse counter should be examined with regard to the actual position of the moving object and corrected, if necessary.

Switching devices may be provided at specific stationary points along the path of the moving object. The switching devices may be operated by the moving object during its movement past said devices. Each switching device produces a signal when the moving object passes it and the signal produced by the switching device is then utilized to set the pulse counter at a specific position. Generally, the switching devices have a response time different from zero. The speed at which the moving object travels may differ in each instance, so that a large number of distance pulses would occur during the response time of the switching devices and exact synchronization would be impossible.

The principal object of the invention is to provide new and improved apparatus and a method for synchronizing digital distance pulse counters.

An object of the invention is to provide apparatus and a method for synchronizing digital distance pulse counters with accuracy, efficiency, effectiveness and reliability.

An object of the invention is to provide apparatus and a method for synchronizing digital pulse counters with simplicity and rapidity.

In accordance with the present invention, apparatus for synchronizing a digital distance pulse counter for a moving object comprises a pulse generator coupled to a moving object for producing distance pulses corresponding to the travel position of the moving object. A stationary switch having a defined response time is positioned along the travel path of the moving object. The switch provides a signal for multiplying the distance pulses produced during $n$ times the response period by the factor $(1+yn)$. A lead counter has inputs coupled to the pulse generator and to the switch for storing the distance pulses and the signal provided by the stationary switch. A distance pulse counter is coupled to the pulse generator and to the lead counter in a manner whereby the distance pulse counter is reset in accordance with the count position of the lead counter.

The distance pulses produced by the pulse generator are additionally supplied to the lead counter upon the termination of the response time and until a specific count position is attained by the lead counter.

A monostable multivibrator is coupled between the switch and the lead counter and has a set time corresponding to the response time of the switch. The monostable multivibrator produces an output signal for the lead counter to enhance the count position of the lead counter. The switch comprises a magnetically operated switch member for resetting the monostable multivibrator.

A frequency multiplier may be connected between the switch and the lead counter for multiplying the number of signals supplied by the switch. The lead counter comprises a multistage dual counter.

A bistable multivibrator is operated by the switch and is adapted to release the lead counter to set the lead counter to a zero count position.

A NOR gate is connected between the lead counter and the distance pulse counter for providing an output signal which sets the individual stages of the distance pulse counter at a specific count position and resets the bistable multivibrator.

The apparatus synchronizes a digital distance pulse counter for an elevator moving in a mine shaft and further comprises driving means coupled to the elevator for moving the elevator up and down. A rotary digitizer is coupled to the driving means for producing pulses in accordance with the angular position of the driving means. At least a single switch is positioned in the mine shaft between two storing points of the elevator. At least two AND gates have inputs connected to the rotary digitizer in a manner whereby the pulses provided by the rotary digitizer control the conductivity condition of the AND gates, in accordance with the direction of rotation of the rotary digitizer. The AND gates have outputs connected to the distance pulse counter. The output of the NOR gate is connected to each of the stages of the distance pulse counter via the AND gates.

In accordance with the invention, a method for synchronizing a digital distance pulse counter for a moving object comprises the steps of producing distance pulses corresponding to the travel position of a moving object, providing a signal for multiplying the distance pulses produced during a response period, storing and counting the distance pulses and the signal, counting the distance pulses, and resetting the count of the distance pulses in accordance with the initial count thereof.

It is thus seen from the foregoing that the basic principle of my invention is to regain the pulses accumulated during the response period, in a subsequent period corresponding to the response time, with the assistance of a multiplication of the pulses produced. After the termination of the interval in which the distance pulses produced are multiplied, the count position of the lead counter will correspond exactly to the distance from the stationary switch device, at a uniform, but unknown, velocity of the moving object. The count position of the lead counter is then utilized to correct the distance pulse counter.

The correction of the distance pulse counter by the lead counter may be effected by known digital adders. In accordance with may invention, however, it is considerably less complicated, to supply the lead counter with distance pulses after the termination of the response time and until the lead counter attains a specific count position. When the lead counter attains such count position, the distance pulse counter needs only to be set at one and the same count position. This requires a considerably lower output.

When the lead counter is supplied with distance pulses after the expiration of the multiplying period, the bistable multivibrator is operated by the stationary switching device and releases the lead counter and resets it to zero. The count position of the lead counter may be readily evaluated in a particularly simple manner by utilizing the NOR gate connected between the lead counter and the inputs of the distance pulse counter. The output signal of the NOR gate sets the individual counting stages of the distance pulse counter to a specific count position and also resets the bistable multivibrator.

When the apparatus of my invention is utilized for mine equipment, a rotary digitizer is mechanically coupled to the motor driving unit for the elevator and corresponds to the angular position of said motor driving unit.

If the object moves in two directions, the pulse counter may be synchronized in a simple manner by connecting the output of the NOR gate to the counting stages of the distance pulse counter via at least two AND gates which are controlled in their conductive condition by output signals from the rotary digitizer, in accordance with the rotary direction thereof.

In order that the present invention may be readily carried into effect, it will now be described with reference to the accompanying drawings, wherein:

FIG. 2 is a block diagram of the lead counter 24 of FIG. 1; and

FIG. 3 is a block diagram of a modified part of the apparatus of the invention utilizing a monostable multivibrator with any desired reset time.

Figure 1:
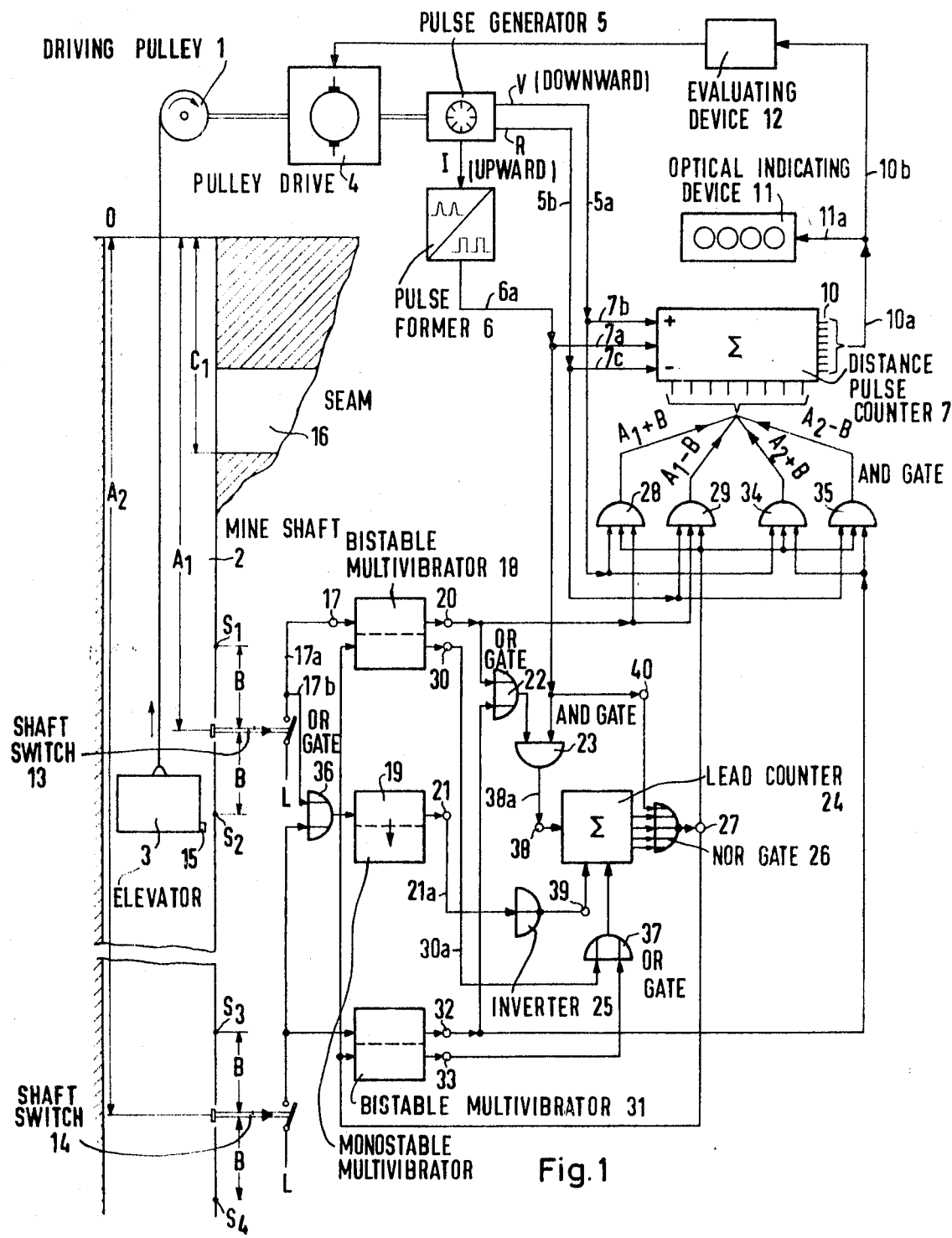
FIG. 1 is a block diagram of an embodiment of the apparatus of the invention for synchronizing digital distance counters.

FIG. 1 illustrates the apparatus and method of the invention applied to an elevator or mine cage 3 moving in a mine shaft 2. The elevator 3 is moved up and down by a driving pulley 1. A pulley drive 4 is coupled to the driving pulley 1 and rotates said pulley either clockwise or counterclockwise to move the elevator 3 upward or downward in the mine shaft 2. A pulse generator 5 is mechanically coupled to the pulley drive 4. The pulse generator 5 may comprise any suitable mechanically motivated pulse generator, such as, for example, a rotary digitizer comprising a nonmagnetic circular disc having a magnetizable peripheral layer which is magnetized at equiangular distances or intervals at alternating magnetic polarities. The magnetic indications on the disc are scanned and sensed by two Hall generators.

When the driving pulley 1 is rotated by the pulley drive 4 to move the elevator 3 up and down in the mine shaft 2, the pulse generator 5 produces pulses I at its output I. The number of pulses I produced by the pulse generator 5 is proportional to the angle of rotation of the driving pulley 1. The direction of rotation of the driving pulley 1 is determined by a termination signal produced at the outputs V and R of the pulse generator 5. When the driving pulley 1 rotates in a counterclockwise direction, so that the elevator 3 moves downward in the mine shaft 2, the pulse generator 5 produces an output pulse V at its output V. When the driving pulley 1 rotates clockwise, so that the elevator 3 is moved upward in the mine shaft 2, the pulse generator 5 produces an output pulse R at its output R.

The pulses I, which indicate the travel distance of the elevator 3, are supplied to a pulse former 6 which converts them to rectangular pulses. The output of the pulse former 6 is supplied to an input of a distance pulse counter 7 via leads 6a and 7a. The output pulses or signals V of the pulse generator 5 are supplied to an adding or positive input + of the distance pulse counter 7 via leads 5a and 7b. The output pulses or signals R of the pulse generator 5 are supplied to the negative input − of the distance pulse counter 7 via leads 5b and 7c. The pulses supplied to the positive input + of the distance pulse counter 7 are counted in the normal additive sequence of said counter and the pulses supplied to the negative input − are counted in the reverse or negative sequence or direction.

The distance pulse counter 7 has a plurality of outputs 10 connected directly to an optical indicating device 11 via leads 10a and 11a and also connected directly to an evaluating device 12 via leads 10a and 10b. The evaluating device 12 functions to produce delay commands which are supplied to the pulley drive 4 during an intended stop of the elevator 3 in the mine shaft 2, in accordance with the count position of the distance pulse counter 7. The delay commands produced by the evaluating device 12 may be supplied to a regulating device, not shown in the FIGS. The delay commands are produced by the evaluating device 12 in a known manner and in accordance with the travel path of the elevator 3.

In the aforedescribed manner, the distance pulse counter 7 projects the instantaneous position of the elevator 3 in the mine shaft 2. In order to correct errors caused by a slip of the cable supporting the elevator 3, the skipping of a pulse, or the inclusion of an interfering pulse, one or more mine shaft switches, such as the switches 14 and 13, are mounted on the wall of the mine shaft 2. The mine shaft switches 13 and 14 are operated by a magnet affixed to the cage or elevator 3 during the travel of said cage past the corresponding one of said switches.

A shaft switch is mounted at each possible stop or halting point of the elevator 3, so that the initiated delay of the pulley drive, in accordance with the travel of said elevator, causes said elevator to stop with the best possible accuracy, at the intended stopping point. The stopping point is determined, in the illustrated example, by a tunnel or seam 16, the position of which indicates the distance $C_1$ from the opening or mouth of the mine shaft 2.

The seam 16 is provided with a mine shaft switch 13 which indicates the distance $A_1$ from the opening of the mouth of the mine shaft 2. The response time of the shaft switch 13 is known. A magnet 15 is mounted on the elevator 3. When the magnet 15 passes the shaft switch 13, moving upward, in the direction of the arrow, the working contact of the shaft switch 13 is closed, and said shaft switch supplies a binary signal 1. The binary signal 1 provided by the shaft switch 13 is supplied by a source L of direct voltage.

The binary 1 signal supplied by the shaft switch 13 is supplied simultaneously to an input 17 of a bistable multivibrator or flip-flop 18 and to the input of a monostable multivibrator or flip-flop 19. The binary 1 signal provided by the shaft switch 13 is supplied to the bistable multivibrator 18 via a lead 17a and is supplied to the input of the monostable multivibrator 19 via a lead 17b and an OR gate 36. The bistable multivibrator 18 thus produces a binary 1 signal at its output 20 and the monostable multivibrator 19 produces a binary 1 signal at its output 21.

The binary 1 signal at the output 20 of the bistable multivibrator 18 is supplied to an AND-gate 23 via an OR gate 22, so that when the I pulses produced by the pulse generator 5 are supplied to said AND gate, said pulses are transferred by said AND gate to an input 38 of the lead counter 24 via a lead 38a. The set time of the monostable multivibrator 19 corresponds to the response time of the shaft switch 13. Upon the termination of the set time of the monostable multivibrator 19, the signal at the output 21 of said monostable multivibrator changes from binary 1 to binary 0. The changed signal at the output 21 of the monostable multivibrator 19 effects the count of the lead counter 24 by being supplied to an input 39 of said lead counter 24 via an inverter 25 and a lead 21a. When a binary 0 signal is supplied thereto, the inverter 25 supplies a pulse to the lead counter 24 which doubles the count position of said lead counter.

At the time that the output signal at the output 21 of the monostable multivibrator 19 is binary 0, and if the cage 3 continues to move upward uniformly, the count position of the lead counter 24 corresponds exactly to the distance of the magnet 15 on said cage from the shaft switch 13. The pulses I produced by the pulse generator 5 are also supplied to the lead counter 24, which counts said pulses until it indicates a count position which corresponds to a specific distance B from the shaft switch 13. The distance B from the shaft switch 13 is preferably selected so that it is greater than the path travelled by the elevator 3 at the maximum feasible velocity thereof, during the response time of the shaft switch 13.

Upon the arrival of the magnet 15 at the predetermined counting position B, a pulse appears, during the subsequent pulse interval of the pulse sequence I produced by the pulse generator 5, at an output 27 of a NOR-gate 26. Due to the pulse at the output 27 of the NOR-gate 26, a binary 1 signal occurs at the output of an AND-gate 29 during the upward travel of the elevator 3, and at the output of an AND-gate 28 during the downward travel os said elevator. The operating magnet 15 on the elevator 3 is then located exactly in a position $S_1$ or $S_2$. The position $S_1$ is a distance $A_1 - B$ from the mouth of the mine shaft 2. The position $S_2$ is a distance $A_1 + B$ from the mouth of the mine shaft 2.

The output signals of the AND gates 28 and 29 are supplied to corresponding inputs of the distance pulse counter 7 and supplied to individual counting stages of said pulse counter. The outputs of the AND-gates 28 and 29 are so connected to the corresponding inputs of the pulse counter 7 that a binary 1 signal provided at the output of the AND-gate 29 moves the count position of said counter to one which corresponds to the path distance $A_1 - B$. The outputs of the AND-gates 28 and 29 are so connected to the corresponding inputs of the pulse counter 7 that a binary 1 signal provided at the output of the AND-gate 28 moves the count position of said counter to one which corresponds to the path distance $A_1 + B$; this being effective only during the downward travel of the elevator 3.

When a binary 1 signal is provided at the output 27 of the NOR-gate 26, the bistable multivibrator 18 is simultaneously switched to its reset condition. The bistable multivibrator 18 therefore produces a binary 0 signal at its output 20, which signal switches and AND-gate 23 to its nonconductive condition, so that said AND gate blocks further pulses I from the pulse generator 5. The binary 1 signal which is produced at the output 30 of the bistable multivibrator 18 at the same time, is supplied to the lead counter 24 via a lead 30a and an OR-gate 37. Such binary 1 signal moves the count position of the lead counter 24 back to zero, so that said lead counter is then prepared for the next succeeding synchronizing operation.

Analogously, the distance pulse counter 7 may be synchronized at positions $S_3$ and $S_4$ by utilizing an additional shaft switch 14, an additional bistable multivibrator 31, and additional AND-gates 34 and 35. In order to expand the apparatus to more than four synchronizing positions, it is only necessary to provide each additional shaft switch with a bistable multivibrator and two AND gates, and to connect the working contact of the shaft switch to another input of the OR-gate 36. Thus, the apparatus and method of my invention are simple and reliable in projecting the travel path of moving objects, and may be applied, without special measures, for both directions of travel, and may be expanded at a minimum cost for an arbitrary number of synchronizing positions.

FIG. 2 illustrates the lead counter 24 of FIG. 1 in greater detail. The inputs and outputs are identified by the same reference numerals as in FIG. 1. The components of FIG. 1 shown in FIG. 2 are identified by the same reference numerals. The lead counter 24 comprises a four stage dual counter. The individual counting stage outputs are indicated by $Z_1$, $Z_2$, $Z_3$ and $Z_4$. The complementary counting stage outputs are $\bar{Z}_1$, $\bar{Z}_2$, $\bar{Z}_3$ and $\bar{Z}_4$. In the counter illustrated in FIG. 2, the maximum counting capacity is $2^4$ or 16 units.

The count position of the dual counter doubles in a particularly simple manner, since the information content or data of one counting stage is transferred to the next succeeding stage. To accomplish this, the outputs of the individual counting stages $Z_1$ to $Z_4$ and $\bar{Z}_1$ to $\bar{Z}_4$ are always connected to prepared inputs of the next succeeding counting stages, and the releasing inputs of all the counting stages are connected to the input terminal 39.

A signal at the input terminal 39, which changes from binary 0 to binary 1 thus transfers the count position of each counting stage to the next adjacent counting stage so that the count position is altogether doubled. The inputs of the complementary counting stages $\bar{Z}_1$ to $\bar{Z}_4$ are connected to the output of the OR-gate 37. Thus, a binary 1 signal at the output of the OR gate 37 switches the four counting stages to a position wherein the complementary counting stages $\bar{Z}_1$ to $\bar{Z}_4$ provide a binary 1 signal. The lead counter 24 is thus switched to a zero count position.

Conversely, when the counter reaches its highest count position, which is 16 in the embodiment of FIG. 2, and corresponds to the path position B of FIG. 1, all the complementary counting stages $\bar{Z}_1$ to $\bar{Z}_4$ have zero signals. During the next succeeding pulse intervals of the pulse sequence I produced by the pulse generator 5 of FIG. 1, a zero signal is produced as the input terminal 40 of the NOR-gate 26 and a binary 1 signal is provided at the output 27 of said NOR gate.

In the embodiment of FIGS. 1 and 2, the reset period of the monostable multivibrator 19 corresponds exactly to the response time of the mine shaft switch. As a result of this, the pulses arriving during the reset time are doubled. In the modification of FIG. 3, the reset time of the bistable multivibrator 18 may be $n$ times the reset time of the mine shaft switch 13. Thus, even in this case, the pulses which are not measured, that is, which are lost during the reset time of the shaft switch 13, are regenerated and the pulses produced during the reset time of the bistable multivibrator 18 by the pulse generator 5 are multiplied by a factor $1+1/n$.

When $n=1$, the pulses are doubled, as in the embodiment of FIG. 1. The only difference is that in FIG. 1, the doubling of the pulses is effected after the reset time of the bistable multivibrator 18, by doubling the count position of the lead counter 24. In the embodiment of FIG. 3, however, the doubling of the pulses is effected during the reset period by continuous frequency multiplication of the input pulse sequence.

In the modification of FIG. 3, only that portion of the circuit which deviates from the embodiment of FIG. 1 is illustrated. The same components of FIGS. 1 and 3 are identified by the same reference numerals. The output lead 6a of the pulse generator 6 is connected to the input of a frequency multiplier 41. The frequency multiplier 41 multiplies the pulse sequence few to its input by an arbitrary factor by an appropriate setting of its input switches, indicated in FIG. 3 by a series of horizontal arrows.

The frequency multiplier is a known unit and is described, for example, in Austrian Pat. No. 241,860. The multiplication factor of the frequency multiplier 41 is adjusted in a manner whereby it has the value $1+1/n$, wherein $n$ is the ratio of the reset period of the monostable multivibrator 19 to the response time T of the shaft switch 13. The output of the frequency multiplier 41 is supplied to one input of an AND-gate 42. The other input of the AND-gate 42 is connected to the output of the monostable multivibrator 19. The monostable multivibrator 19 has a reset time $nT$.

When the monostable multivibrator 19 is operative in the manner described with reference to FIG. 1, so that a binary 1 signal is provided at the output 21 in said monostable multivibrator, and AND-gate 43 is switched to its nonconductive condition by the binary 0 signal which is then produced at the output of an inverter 44. The AND-gate 42 remains in its conductive condition. Thus, for the duration of the reset period, the pulses multiplied by the factor $1+1/n$ may arrive at the input 38 of the lead counter 24 via an OR-gate 45, as in FIG. 1, wherein the AND-gate 23 is utilized.

On the other hand, when the monostable multivibrator 19 has returned to its stable condition, during which a binary 0 signal is provided at its output terminal 21, and AND-gate 43 is in its conductive condition and the AND-gate 42 is in its nonconductive condition. Thus, the pulses produced by the pulse generator 5 may be directly supplied to the AND-gate 23.

The modification of FIG. 3 permits the utilization of a monostable multivibrator stage with substantially any desired reset time. The reset time of the monostable multivibrator is adjusted to the response time of the mine shaft switch 13, in a manner hereinbefore described, by an appropriate setting of the multiplication factor of the frequency multiplier 41. A dual counter is a counter operating in a dual code, in contrast to a decimal counter which operates as a binary coded decimal counter. In this type of counter, the individual counter stages are so arranged that a number of increasing magnitude results from the prime number 2. A code jump does not occur. Doubling may be effected in an especially simple manner by shifting the contents of the individual counter stages by one counter stage. This may be released by an especially simple binary signal, whereupon each counter stage assumes the contents of the adjacent lower valent counter stage.

While the invention has been described by means of specific examples and in specific embodiments, I do not wish to be limited thereto, for obvious modifications will occur to those skilled in the art without departing from the spirit and scope of the invention.

I claim:

1. Apparatus for synchronizing a digital distance pulse counter for a moving object, said apparatus comprising
   pulse generating means coupled to a moving object for producing distance pulses corresponding to the travel position of said moving object;
   stationary switching means having a defined response time positioned along the travel path of said moving object, said switching means providing a signal for multiplying the distance pulses produced during a number n times the response time by the factor $(1+1/n)$;
   lead counting means having inputs coupled to said pulse generating means and to said stationary switching means for storing said distance pulses and the signal provided by said stationary switching means; and
   distance pulse counting means coupled to said pulse generating means and to said lead counting means in a manner whereby said distance pulse counting means is reset in accordance with the count position of said lead counting means.

2. Apparatus as claimed in claim 1, wherein the distance pulses produced by said pulse generating means are additionally supplied to said lead counting means upon the termination of the response time and until a specific count position is attained by said lead counter.

3. Apparatus as claimed in claim 1, further comprising a monostable multivibrator coupled between said stationary switching means and said lead counting means and having a set time corresponding to the response time of said switching means, said monostable multivibrator producing an output signal for said lead counting means to enhance the count position of said lead counting means, and wherein said switching means comprises a magnetically operated switch member for resetting said monostable multivibrator.

4. Apparatus as claimed in claim 1, further comprising a frequency multiplier connected between said stationary switching means and said lead counting means for multiplying the number of signals supplied by said pulse generating means during the response time of said switching means, and wherein said switching means comprises a magnetically operated switch member.

5. Apparatus as claimed in claim 3, wherein said lead counting means comprises a multistage dual counter.

6. Apparatus as claimed in claim 5, further comprising a bistable multivibrator operated by said switching means and adapted to release said lead counting means from pulses from the pulse generating means and to set said lead counting means to a zero count position.

7. Apparatus as claimed in claim 6, further comprising a NOR gate connected between the lead counting means and the distance pulse counting means for providing an output signal which sets the individual stages of said distance pulse counting means at a specific count position and resets the bistable multivibrator.

8. Apparatus as claimed in claim 7, for synchronizing a digital distance pulse counter for an elevator moving in a mine shaft, further comprising driving means coupled to said elevator for moving said elevator up and down, a rotary digitizer coupled to said driving means for producing pulses in accordance with the angular position of said driving means, and at least a single stationary switch positioned in said mine shaft between two stopping points of said elevator.

9. Apparatus as claimed in claim 8, further comprising at least two AND gates having inputs connected to said rotary digitizer in a manner whereby the pulses provided by said rotary digitizer control the conductivity condition of said AND gates in accordance with the direction of rotation thereof and outputs connected to said distance pulse counting means, and wherein the output of said NOR gate is connected to each of the stages of said distance pulse counting means via said AND gates.

* * * * *